US012621265B2

(12) United States Patent
Szurdi et al.

(10) Patent No.: US 12,621,265 B2
(45) Date of Patent: May 5, 2026

(54) SYSTEM AND METHOD FOR DETECTING DICTIONARY-BASED DGA TRAFFIC

(71) Applicant: Palo Alto Networks, Inc., Santa Clara, CA (US)

(72) Inventors: Janos Szurdi, Sunnyvale, CA (US); Weihan Jiang, San Jose, CA (US); David Qianshan He, Cupertino, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 356 days.

(21) Appl. No.: 17/723,292

(22) Filed: Apr. 18, 2022

(65) Prior Publication Data

US 2023/0336528 A1 Oct. 19, 2023

(51) Int. Cl.
*H04L 9/40* (2022.01)
*G06F 16/353* (2025.01)

(52) U.S. Cl.
CPC ........ *H04L 63/0245* (2013.01); *G06F 16/353* (2019.01); *H04L 63/0236* (2013.01); *H04L 63/1416* (2013.01)

(58) Field of Classification Search
CPC ............. H04L 63/0236; H04L 63/0245; H04L 63/1416; G06F 16/353
See application file for complete search history.

(56) References Cited

U.S. PATENT DOCUMENTS 9,516,039 B1 12/2016 Yen
2010/0205313 A1* 8/2010 Boire-Lavigne .... H04L 65/1069 709/228
2012/0084860 A1 4/2012 Cao
2015/0381653 A1* 12/2015 Starink ............... H04L 63/1441 726/22
2016/0057165 A1 2/2016 Thakar
2016/0099967 A1* 4/2016 Stemm .................... G06F 21/55 726/1
2016/0294773 A1* 10/2016 Yu ....................... H04L 63/1425
2017/0163603 A1 6/2017 Xu
(Continued)

FOREIGN PATENT DOCUMENTS

SG 10202100813 2/2021

OTHER PUBLICATIONS

Curtin et al. "Detecting DGA domains with recurrent neural networks and side information." Proceedings of the 14th International Conference on Availability, Reliability and Security. 2019.
(Continued)

*Primary Examiner* — Daniel B Potratz
*Assistant Examiner* — Matthias Habtegeorgis
(74) *Attorney, Agent, or Firm* — Van Pelt, Yi & James LLP

(57) ABSTRACT

A system and method for detecting dictionary-based DGA traffic is provided. A domain name system (DNS) stream is received. The DNS stream is classified using a per domain dictionary domain generation algorithm (DGA) classifier to generate candidate dictionary DGA domains with cluster information. The candidate dictionary DGA domains are filtered to generate a set of dictionary DGA domains. An action is performed based on a match with a monitored domain name of a monitored DNS request and a dictionary DGA domain of the set of dictionary DGA domains.

9 Claims, 13 Drawing Sheets

(56) References Cited

U.S. PATENT DOCUMENTS

| | | | | |
|---|---|---|---|---|
| 2018/0176232 | A1 | 6/2018 | Rodriguez | |
| 2018/0288086 | A1* | 10/2018 | Amiri | H04L 63/1425 |
| 2018/0351972 | A1* | 12/2018 | Yu | H04L 63/1416 |
| 2019/0058717 | A1 | 2/2019 | Chailytko | |
| 2019/0089721 | A1* | 3/2019 | Pereira | G06F 16/951 |
| 2019/0238562 | A1 | 8/2019 | Manadhata | |
| 2019/0253435 | A1 | 8/2019 | Machlica | |
| 2022/0124069 | A1* | 4/2022 | Chiu | H04L 63/0263 |
| 2022/0245461 | A1* | 8/2022 | Sern | G06N 3/0442 |
| 2023/0130115 | A1* | 4/2023 | Liu | H04L 63/1466<br>726/1 |
| 2023/0319093 | A1* | 10/2023 | Kaimal | H04L 61/4511<br>726/22 |
| 2023/0319106 | A1* | 10/2023 | Rozzo | G06F 18/24<br>726/22 |

OTHER PUBLICATIONS

Highnam et al. "Real-time detection of dictionary dga network traffic using deep learning." SN Computer Science 2.2 (2021): 1-17.
Yu et al. "Character level based detection of DGA domain names." 2018 international joint conference on neural networks (IJCNN). IEEE, 2018.

* cited by examiner intgmxdeadnxuyla.com (CryptoLocker)
axwscwsslmiagfah.com (CryptoLocker)
facebook.com
paloaltonetworks.com

FIG. 1B heavenpatternleader.net (Suppobox)
facebook.com
paloaltonetworks.com
shareleaderspace.net (Suppobox)

RECEIVE DOMAIN NAME SYSTEM
(DNS) STREAM

720

CLASSIFY DNS STREAM USING PER
DOMAIN DICTIONARY DOMAIN GENERATION
ALGORITHM (DGA) CLASSIFIER

730

FILTER CANDIDATE DICTIONARY
DGA DOMAINS

740

PERFORM ACTION

800

810 �── DETERMINE WHETHER AMOUNT OF TIME THAT CANDIDATE DICTIONARY DGA DOMAIN HAS BEEN REGISTERED IS EQUAL TO OR LESS THAN PREDETERMINED AMOUNT OF TIME THRESHOLD

Equal To or Less Than Predetermined Amount of Time Threshold

820 ── INCLUDE CANDIDATE DICTIONARY DGA DOMAIN IN SET OF DICTIONARY DGA DOMAINS

SYSTEM AND METHOD FOR DETECTING DICTIONARY-BASED DGA TRAFFIC

BACKGROUND OF THE INVENTION

Malicious software (malware) generally refers to unwanted, hostile, or intrusive software that can be used to disrupt computer or network operations, collect private or sensitive information, or access private computer systems or networks. Malware can be in the form of executable code, scripts, active content, and other software. Example malware includes computer viruses, worms, Trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 1B is an example of a list of domains generated by a compromised IP address.

FIG. 1C is another example of a list of domains generated by a compromised IP address.

DETAILED DESCRIPTION

Figure 1A:
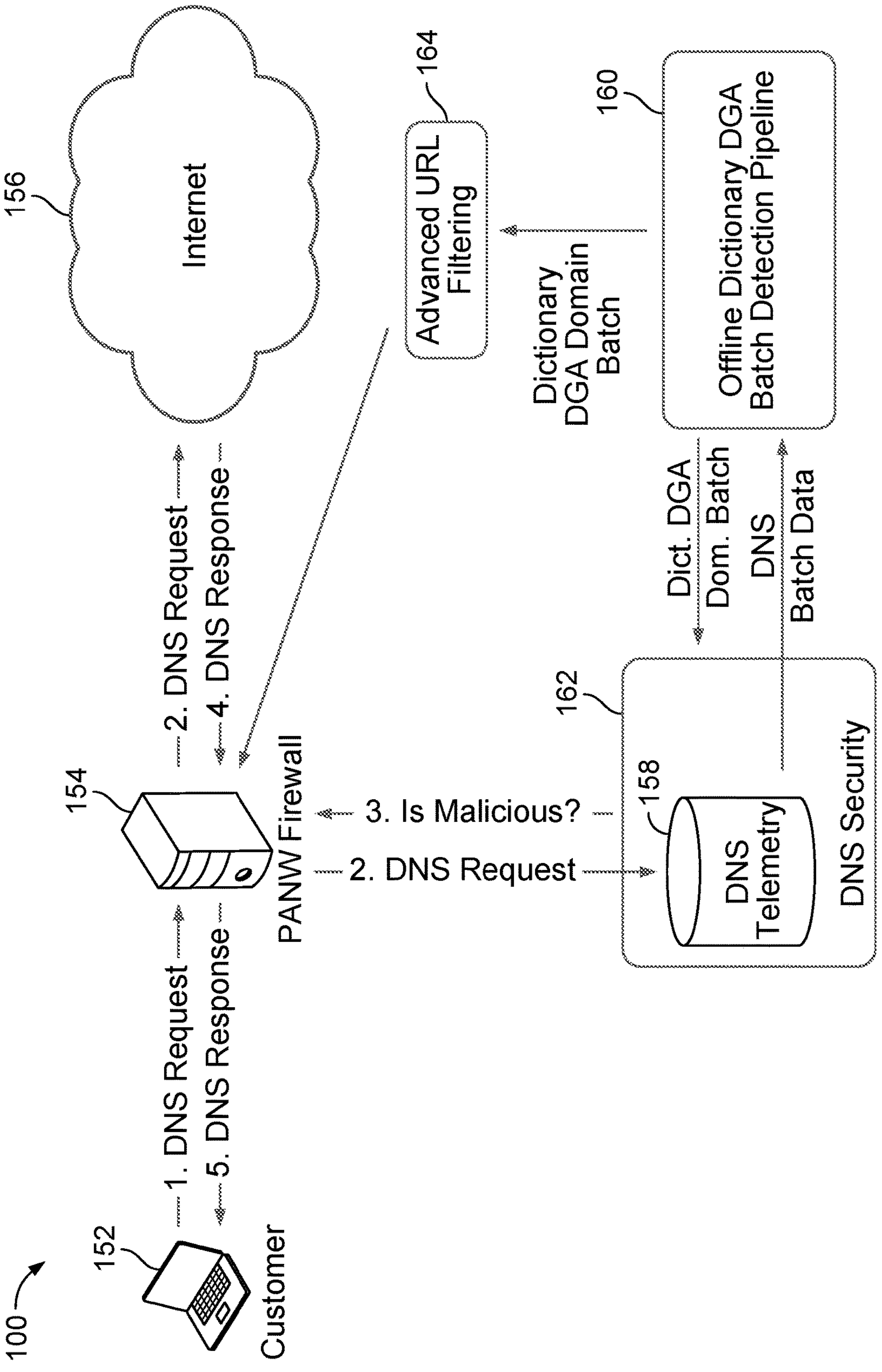
FIG. 1A is a functional block diagram illustrating an architecture for detecting dictionary-based DGA traffic in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Malicious software (malware) generally refers to unwanted, hostile, or intrusive software that can be used to disrupt computer or network operations, collect private or sensitive information, or access private computer systems or networks. Malware can be in the form of executable code, scripts, active content, and other software. Example malware includes computer viruses, worms, Trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

A network domain generally refers to a domain that is identified by a domain name. A domain name typically includes an identification string (e.g., www.example-website.com) that defines a realm of authority or control for a domain on the Internet. Domain names are generally formed by rules and procedures of the Domain Name System (DNS). A domain name can be registered in the DNS as a domain name.

Network domains can be used in various networking contexts and application-specific naming and addressing purposes. For example, a domain name can be used to identify an Internet Protocol (IP) resource, such as a web site (e.g., a server hosting a web site), or any other service accessible via the Internet (e.g., a File Transfer Protocol (FTP) resource or other services accessible via the Internet).

A DNS service can be used to translate a domain name into an IP address. For example, when a user types in a domain name (e.g., an Internet or Intranet domain name), such as example.com, using a web browser, an authoritative DNS server can translate the domain name into an IP address, such as 172.16.254.1 (for IPv4) and 2001:db8:0:1234:0:567:8:1 (for IPv6). However, if a user attempts to perform a DNS lookup or host command on an unregistered or invalid domain name, such as examplefakedomain.com, then an error can be received indicating that such is a non-existing domain name, or in other words, that such is a non-existent domain (NXDOMAIN). Generally, an NXDOMAIN (e.g., an NXDOMAIN response received in response to a DNS query for a given domain name) is a condition or error that can be indicated for an Internet domain name that is unable to be resolved using the DNS servers (e.g., invalid domain name) or that the Internet domain name is not yet registered. In some cases, an NXDOMAIN can also be indicated due to a network or DNS server problem.

Network domains can also be used by malware. For example, malware can be distributed or propagated using a network domain, such as www.bad-malware-download-site.com. As another example, botnet C&C related malware can be associated with a network domain, such as www.botnet-site.com. Various commercial efforts as well as open project efforts exist to provide listings of network domains (e.g., bad/malware domains) that are known to be used to distribute or propagate malware. Some approaches use such network domain listings (e.g., bad/malware domain listings) to provide spoofed replies, in response to any requests to a network domain on such a listing, as a mechanism for preventing propagation of malware distribution.

Blackholing is a technique that can be used to send all traffic (e.g., network communications) to a network domain (e.g., DNS or IP address) to a null interface or non-existent server (e.g., sometimes referred to as a black hole). For example, an Internet Service Provider (ISP) can manage such blackholing for efficiency and to avoid affecting network connectivity. However, while blackholing may be efficient for certain types of severe network attacks, such an approach fails to allow for analysis of the traffic to the blackholed network domain.

Sinkholing generally refers to a technique for routing traffic (e.g., network communications) to a valid IP address. For example, a security device (e.g., a network device, which can be implemented using a server or appliance) associated with the valid IP address can receive the traffic that was directed (e.g., redirected) to the sinkholed IP address that is associated with the network domain. The security device that receives the traffic can analyze the traffic. Based on the analysis of the traffic, the security device can then perform an action (e.g., reject bad packets or perform some other action).

For example, malware, such as C&C malware and/or other types of malware, can generate many different network domains, such as by using Domain Generation Algorithms (DGAs). Generally, malware utilizes the DGA approach to generate many different domain names for detection evasion purposes and take-down evasion purposes. DGA-based malware can attempt to resolve multiple DGA domain names until the DGA-based malware locates a domain name that allows communication with a command and control server.

However, existing approaches fail to accurately and/or efficiently identify DGA behavior on a network (e.g., an enterprise IP-based network or other network). Also, existing approaches fail to determine whether a given host device that is sending DNS queries to non-existent network domains (e.g., NXDOMAINs) may be infected with DGA malware (e.g., including a previously new or not yet identified, known version of DGA malware executing on the host device).

What is needed are new and improved techniques for identifying and monitoring DGA behavior on a network.

Accordingly, techniques for Domain Generation Algorithm (DGA) behavior detection are provided.

In some embodiments, a system/method/computer program product for detecting dictionary-based DGA traffic includes receiving a domain name system (DNS) stream; classifying the DNS stream using a per domain dictionary domain generation algorithm (DGA) classifier to generate candidate dictionary DGA domains with cluster information; filtering the candidate dictionary DGA domains to generate a set of dictionary DGA domains; and performing an action based on a match with a domain name of a monitored DNS request and a dictionary DGA domain of the set of dictionary DGA domains.

In some embodiments, the classifying of the DNS Stream includes classifying the DNS stream using a per domain deep learning dictionary DGA classifier to generate the candidate dictionary DGA domains with cluster information.

In some embodiments, the classifying of the DNS Stream includes classifying the DNS stream using a per domain machine learning dictionary DGA classifier to generate the candidate dictionary DGA domains with cluster information.

In some embodiments, the filtering of the candidate dictionary DGA domains includes determining whether an amount of time that a candidate dictionary DGA domain has been registered is equal to or less than a predetermined amount of time threshold; and in response to a determination that the amount of time that the candidate dictionary DGA domain has been registered is equal to or less than the predetermined amount of time threshold, including the candidate dictionary DGA domain in the set of dictionary DGA domains.

In some embodiments, the performing of the action includes generating an alert.

In some embodiments, the performing of the action includes blocking a response for the domain name.

In some embodiments, the performing of the action includes responding with a sinkhole IP address.

In some embodiments, the cluster information includes a source IP address of the one DNS request.

In some embodiments, the cluster information includes a source IP address of a firewall forwarding the one DNS request.

In some embodiments, a system/method/computer program product for detecting dictionary-based DGA traffic includes receiving a domain name system (DNS) stream, the DNS stream including a plurality of DNS requests; segmenting a domain name of one of the plurality of DNS requests into a set of words; extracting features from the set of words to generate a set of dictionary DGA domains using a classifier; and performing an action based on a match with a monitored domain name of a monitored DNS request and a dictionary DGA domain of the set of dictionary DGA domains.

In some embodiments, the segmenting of the domain name includes scoring segmentation options of the domain name using a word database, the word database including a set of words and a set of corresponding frequencies, a frequency relating to a ratio the word appears in text; and selecting a segmentation option having a highest score.

In some embodiments, the segmenting of the domain name includes performing auxiliary natural language processing (NLP) on unselected segmentation options to optimize the results.

In some embodiments, the per domain dictionary DGA classifier includes a machine learning classifier.

In some embodiments, the per domain dictionary DGA classifier includes a deep neural network.

In some embodiments, the features include a part of speech, the part of speech including a noun, a verb, or both.

FIG. 1A is a functional block diagram illustrating an architecture for detecting dictionary-based DGA traffic in accordance with some embodiments. In some embodiments, the architecture 100 includes a customer 152, a Firewall 154, The Internet 156, DNS Telemetry Module 158, an Offline Dictionary DGA Batch Detection Pipeline 160, a DNS Security Module 162, and An Advanced URL Filtering Module 164.

In operation 1, the customer 152 sends a DNS request to the Firewall 154.

In operation 2, the Firewall 154 forwards the DNS request to the Internet 156 so that the DNS request can be resolved, and also forwards the DNS request to the DNS Security Module 162.

In some embodiments, the DNS Telemetry Module 158 of the DNS Security Module 162 forwards the DNS batch data to the Offline Dictionary DGA Batch Detection Pipeline 160 which provides Dictionary DGA Domain Batch information to the DNS Security Module 162 and the Advanced URL Filtering Module 164.

In some embodiments, the Advanced URL Filtering Module 164 sends its output to the Firewall 154.

In operation 3, the DNS Security Module 162 sends its output (malicious or benign) to the Firewall 154.

In operation 4, the Firewall 154 received a DNS response from the Internet 156.

In operation 5, based on the DNS response and the outputs of the DNS Security Module 162 and Advanced URL Filtering Module 164, the Firewall 154 sends a DNS response to the customer 152.

In some embodiments, the DNS response includes among other information whether the request was a non-existent (NX) request. The NX request count (NX count) can be used in cluster-based filtering. The NX count information is not always available in some network security architectures. Also, information related to DNS responses can be used for additional response data based clustering.

Figure 1B:
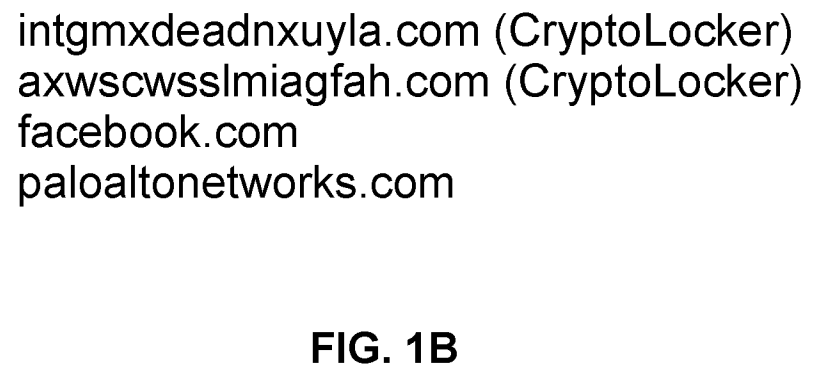

FIG. 1B is an example of a list of domains generated by a compromised IP address. Malware that infected a host computer associated with the compromised IP address generates DNS requests using a DGA. As shown in the list of domains, the infected host computer was infected with the malware from the CryptoLocker family. Typically, identifying infected computers is not difficult because the DNS requests issued by the infected host computer are composed of random characters (or alphanumeric characters), e.g., intgmxdeadnxuyla.com and axwscwsslmiagfah.com, which are illegitimate domains. The list of domains also shows legitimate DNS traffic, e.g. facebook.com and paloaltonetworks.com.

FIG. 1C is another example of a list of domains generated by a compromised IP address. The first generation of DGA generated domains were easily detectable because the domains were made up of random characters, a next generation of DGA was created called dictionary-based DGA. Because the dictionary-based DGA generates domains that are composed of dictionary words, the dictionary-based DGA generates domains that resemble legitimate domains. In this example, the malware family Suppobox generates domains such as, e. g., heavenpatternleader.net and shareleaderspace.net, which look like legitimate domains but are illegitimate domains. Also, the list of domains also shows legitimate DNS traffic, e.g. facebook.com and paloaltonetworks.com.

Figure 2:
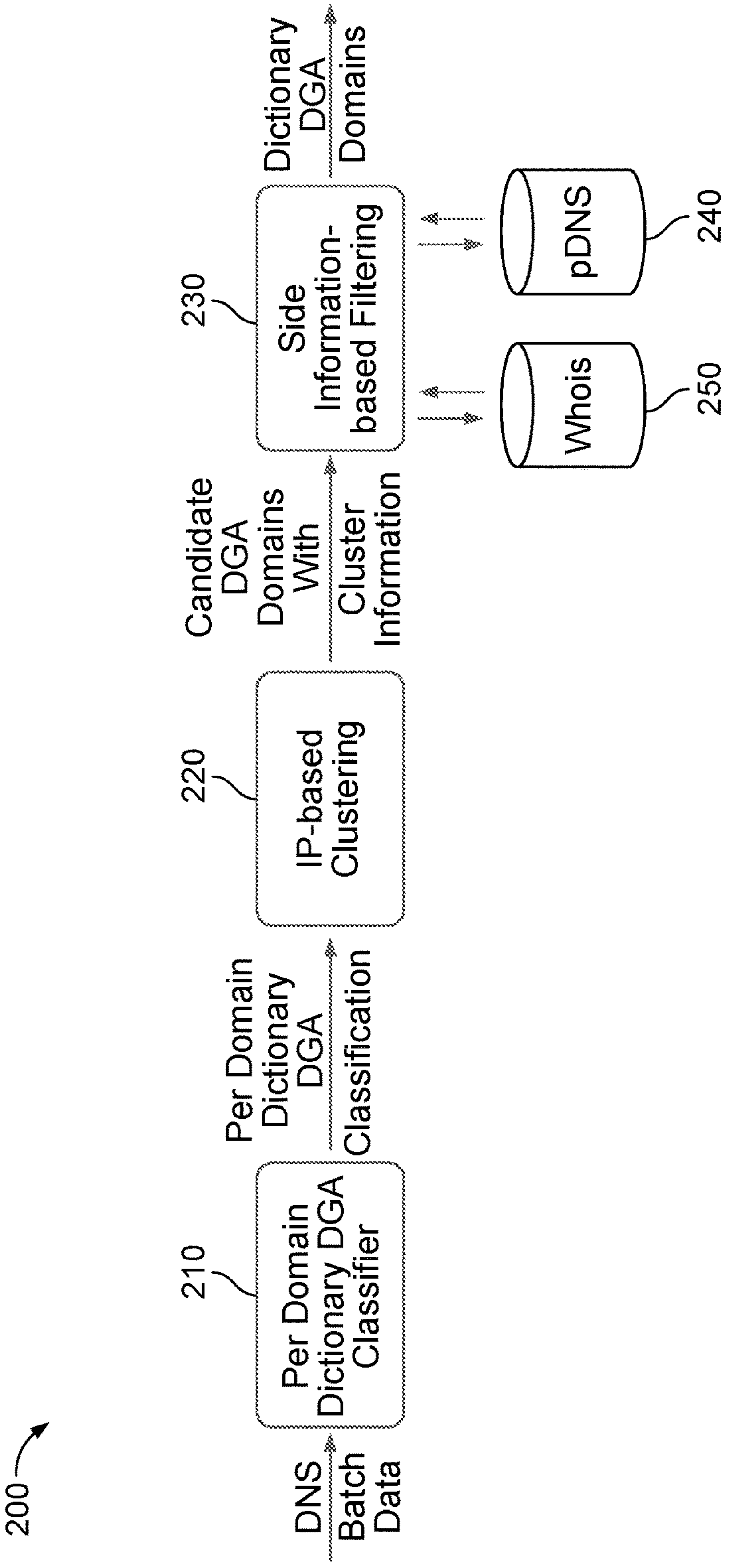
FIG. 2 is an example of a workflow for detecting dictionary-based DGA traffic.

FIG. 2 is an example of a workflow for detecting dictionary-based DGA traffic. In the example, the workflow 200 is implementation of the Offline Dictionary DGA Batch Detection Pipeline 160 for FIG. 1A and includes a Per Domain Dictionary DGA Classifier 210, an IP-based Clustering Module 220, a Side Information-based Filtering Module 230, a passive DNS (pDNS) module 240, and a Whois module 250.

In some embodiments, the Per Domain Dictionary DGA Classifier 210 received the DNS batch data and outputs domains classified as dictionary DGA generated domains or benign domains. The classified domains are input to the IP-based Clustering Module 220, which clusters the dictionary DGA generated domains to generate candidate DGA domains with statistical information about the cluster. The statistical information can include the number of malicious and benign DGA domains, the ratio of the number of malicious and benign DGA domains for each cluster, etc. In an example, the cluster is determined based on an IP address of the firewall that originated the DNS request. In another example, the cluster is determined based on a source IP address or other identifier of the customer/device that originated the DNS request.

In some embodiments, the candidate DGA domains are input into the Side Information-based Filtering Module 230, the Side Information-based Filtering Module 230 accesses the Whois module 250 to confirm that the candidate domain has been registered for more than one year and has been regularly accessed as determined by the pDNS module 240, and in the event that the candidate domain has been registered for more than one year or has been regularly accessed over time, the candidate domain is filtered out and the remaining candidate domains are output as Dictionary DGA domains.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Figure 3A:
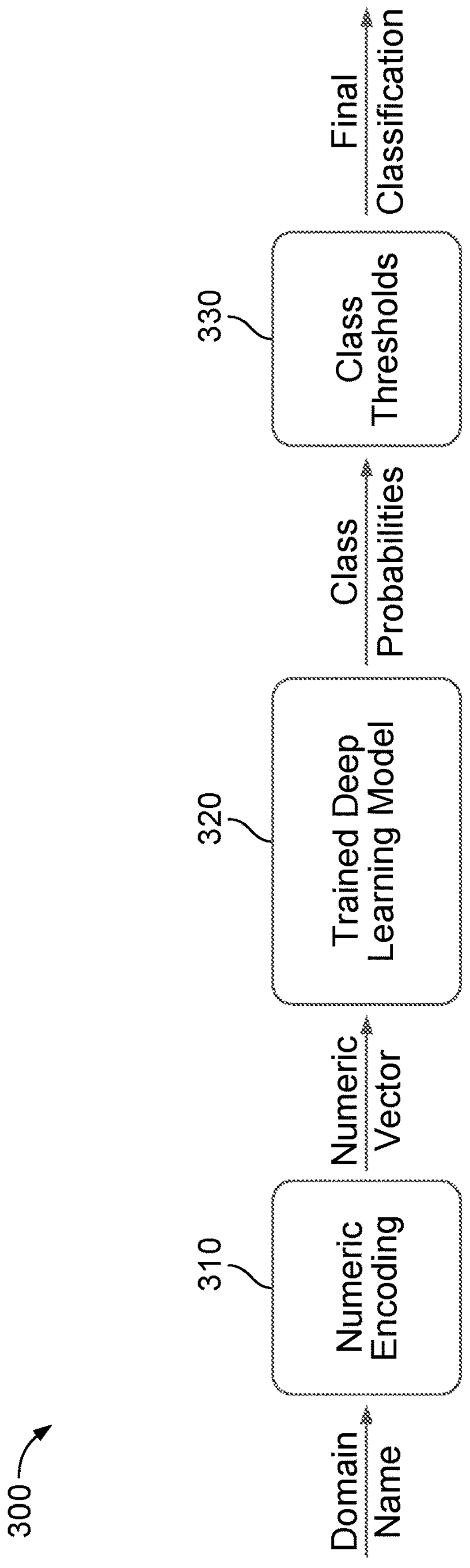
FIG. 3A is an example of a workflow for performing per domain deep learning dictionary DGA classification.

FIG. 3A is an example of a workflow for performing per domain deep learning dictionary DGA classification. In some embodiments, the workflow 300 is an implementation of the Per Domain Dictionary DGA Classifier 210 of FIG. 2 and includes a numeric encoding module 310, a trained deep learning module 320, and a class thresholds module 330.

In some embodiments, the numeric encoding module 310 receives domain names as input, and outputs numeric vectors that are more suitable for trained deep learning models. For example, domain name example.com is translated into a fixed length numeric vector which is padded at the right with zeros so that the numeric vector reaches the maximum domain name length, and only the root portion of the domain name is used without the top-level domain (TLD). In this example, each letter of the root is translated to a numeric value, so “example” is translated to 15, 34, 11, 23, 26, 22, 15, which is padded by leading zeros to obtain the numeric vector.

In some embodiments, the numeric vectors are inputted into the trained deep learning module 320, and outputs a numeric vector that corresponds to class probabilities. In some embodiments, the trained deep learning module 320 is a pre-trained deep neural network.

As an example, using seven malware families and one benign class, a vector of eight numerical values corresponding to a probability of each class are output. As an example, a vector [0.2, 0.01, 0.1, 0.3, 0.04, 0.25, 0.05, 0.05] is output. In the example, there is a 30% probability (0.3) that the fourth malware family exists and the benign class has a 5% probability (0.05) of existing.

In some embodiments, the class thresholds module 330 receives the class probabilities and selects a class based on a set of thresholds. For example, if the class thresholds module 330 wants to achieve a high precision in determining whether a domain is malicious then the class thresholds module 330 sets a low threshold, e.g. a 1% probability (0.01), for discarding the possibility that the domain is benign to avoid false positive. In the event that the received benign class probability is equal to or less than 0.01, the class thresholds module 330 ignores that class probability. In the event that the received benign class probability is more than 0.01, the class thresholds module 330 classifies the domain as benign even if there is a higher class probability for a malware family.

Figure 3B:
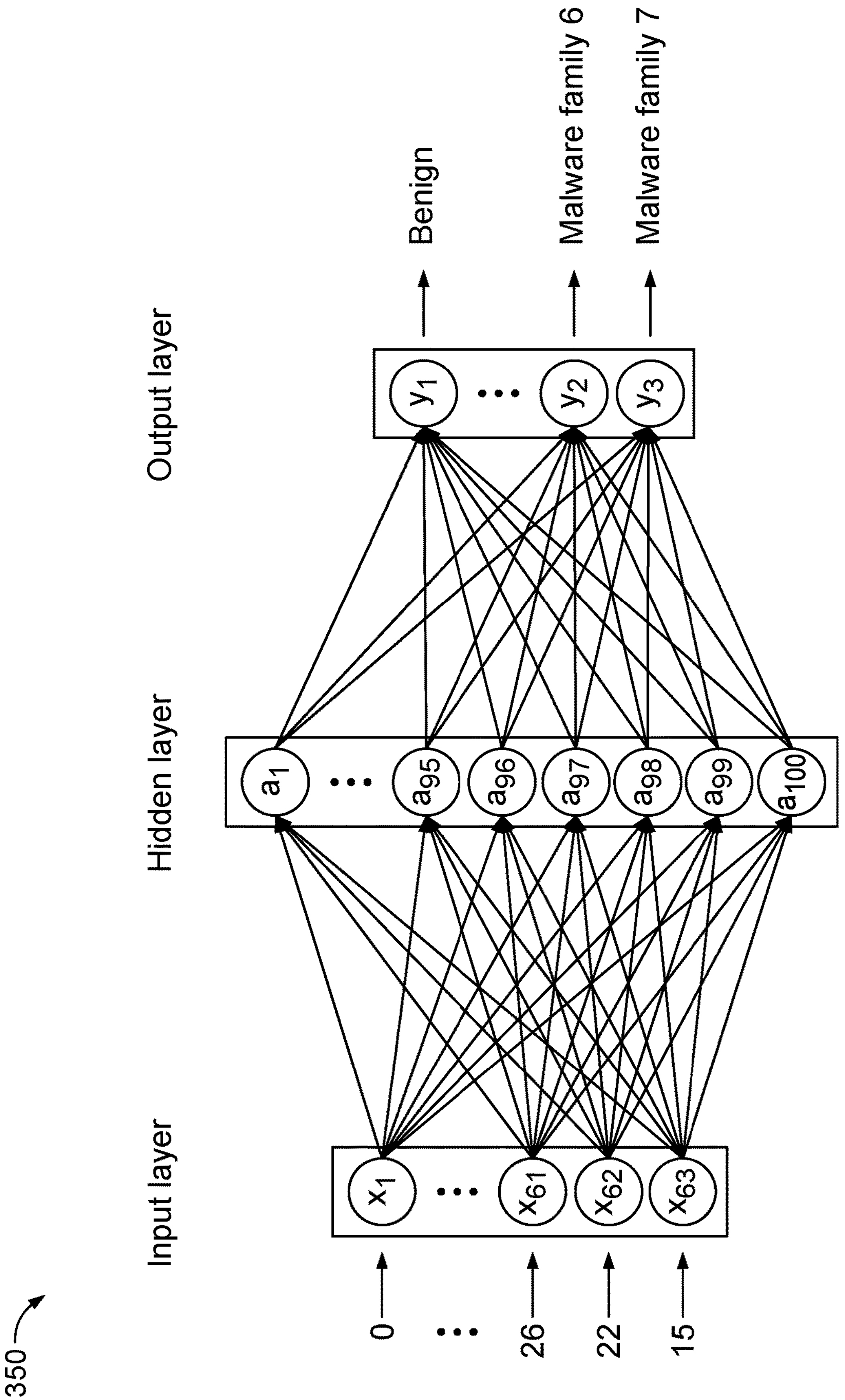
FIG. 3B is an example of a neural network.

FIG. 3B is an example of a neural network. In neural network 350, vector x can be the input layer for our neural network (e.g., [0, 0, . . . 0, 15, 34, 11, 23, 26, 22, 15] representing the word “example”). The input layer is fed into the hidden layer. The output of the hidden layer is computed as $a=\sigma(W \cdot x+b)$. W can be a weight matrix of the hidden layer where each row represents a neuron and each value in a row can represent an importance of an input value for the neuron. As an example, the hidden layer has 100 neurons and the input layer includes 63 numeric inputs then the weight matrix is 100×63 matrix. The function a can be any nonlinear function, such as, for example, sigmoid, tanh, and ReLu functions. The nonlinear functions allow the neural network 450 to learn nonlinear functions between the input and output. The output layer can be similar to the hidden layer but the inputs of the output layer are the outputs of the hidden layer. If there are eight classes and a hundred neurons in the hidden layer then the weight matrix of the output layer is to be a 8×100 matrix.

The neural network 350 is one example, and other neural networks can be used to classify domains as dictionary DGA domains. The other neural networks can include more layers than in neural network 350 and can have different layers including recurrent neural network layers, convolutional neural network layers, Long Short-Term Memory (LSTM) layers, gated recurrent layers, transformer layers, dropout layers, etc. The other neural networks can use various word embeddings, regularization, multi-representation, different activation functions, different sizes for each layer, separately trained deep learning language model, word splitting, etc.

Some of the benefits of using a deep neural network in comparison to a machine learning technique is that there is no need for feature engineering, which can require a great deal of effort to properly implement because identifying optimal features can be difficult and the optimal features can change over time as malware families evolve and new malware families are identified.

Figure 4:
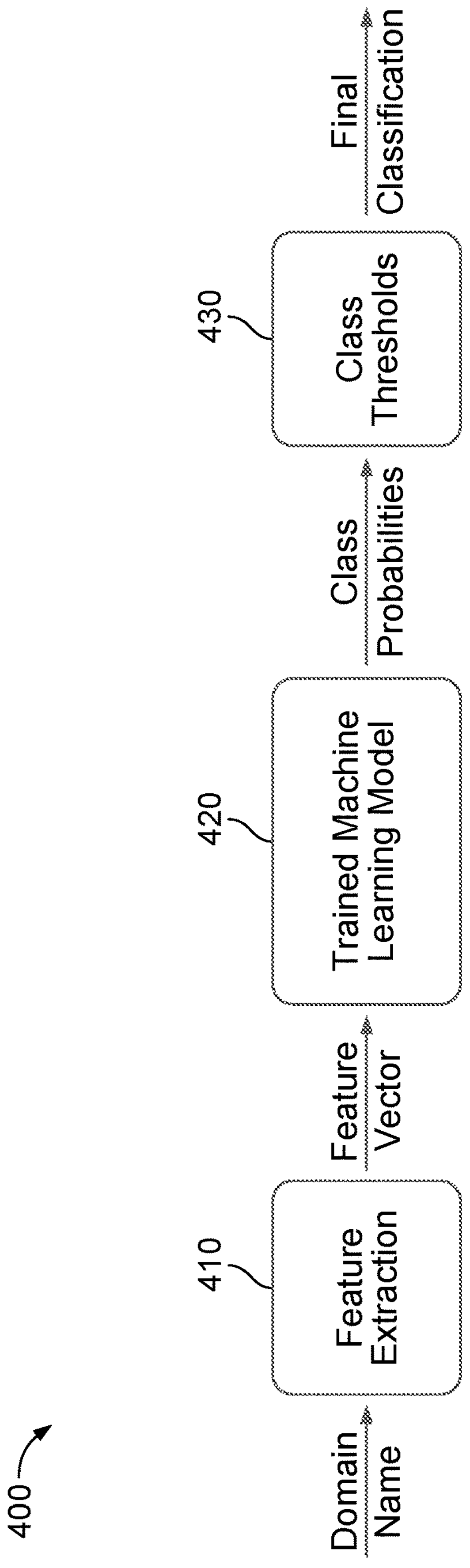
FIG. 4 is an example of a workflow for performing per domain machine learning dictionary DGA classification.

FIG. 4 is an example of a workflow for performing per domain machine learning dictionary DGA classification. In some embodiments, the workflow 400 is an implementation of the Per Domain Dictionary DGA Classifier 210 of FIG. 2 and includes a feature extraction module 410, a trained machine learning model 420, and a class thresholds module 430.

In some embodiments, the feature extraction module 410 receives a domain name, extracts features from the domain name, and outputs a feature vector. In some embodiments, the domain name is segmented into a set of segmented words and the features are extracted from the set of segmented words.

In some embodiments, features include natural language processing (NLP) features, which fall into three categories: domain level features, meaningfulness-level features, and part-of-speech level features.

The domain level features can include, for example, domain length, total word pair count, etc.

The meaningfulness-level features can include, for example, a meaningful word count, a meaningful word ratio, a meaningful character ratio, etc.

In some embodiments, the meaningful-level features relate to meaningful pair count, meaningful pair ratio-enchant, meaningful pair ratio-google, character count of meaningful pair count, character count of total word pair count, meaningful character pair ratio, etc. As an example, the Enchant Library can be used to determine the meaningful word count and/or the meaningful character count. In another example, the Google trillion-word Corpus (Google Corpus) can be used to determine the meaningful word count and/or the meaningful character count.

Using the URL trainstationhellocup.com as an example, the URL is segmented using Google Corpus to obtain a set of words [“train”, “station”, “hello”, “cup” ]. In the example, the total pair count of words is three, which includes (“train”, “station”), (“station”, “hello”), and (“hello”, “cup”). In the example, each of the three pairs is checked to determine whether there is a linguistic meaning. In the example, only the first pair is meaningful (has a linguistic meaning), so the meaningful pair count is one. The meaningful pair ratio is defined as the meaningful pair count divided by the total word pair count (the meaningful pair count/the total word pair count). The meaningful pair ratio is 1/3 (0.3333). The meaningful character pair ratio is a sub-feature obtained from the meaningful pair ratio, and is defined as: character count of the meaningful pair count divided by character count of the total word pair count (character count of the meaningful pair count/character count of the total word pair count).

Both the Enchant Library and the Google Corpus can be used to generate the meaningful-level features. For example, "meaningful pair ratio-enchant" and "meaningful pair ratio-google" are extracted meaningful-level features. Meaningful-level features extracted using Different corpus can have different weight in the NLP model. Because of the nature of URL naming convention, Internet based corpuses (e.g., Enchant Library and Google Corpus), which include more informal words, are given larger weights.

The part-of-speech level features can include, for example, a number of nouns included in the domain name, a number of verbs included in the domain name, etc.

In some embodiments, the part-of-speech level features include frequent part-of-speech (PoS) tagging count, frequent PoS tagging ratio, etc. For example, a word is determined to be either a noun or a verb.

In NLP, PoS tagging includes tagging each word with a PoS. For example, a word can be tagged as a noun, a verb, an adjective, an adverb, a "single character" (for example: "x"), an "Internet typographical error" (for example, fir instead of "for"), etc. The most frequently tagged PoS are collected for bi-grams. When a URL is received and segmented into a set of words, the words of the set of words are tagged using their PoS, and determined whether each bi-gram is a frequent PoS bi-gram (above a frequency threshold or a top ranked bi-gram). The frequent PoS tagging count relates to how many bi-grams appeared to be frequently used in the PoS bi-gram collections. The frequent PoS tagging ratio corresponds to a frequent part-of-speech (PoS) tagging count divided by a total PoS bi-gram count (a frequent PoS tagging count/total PoS bi-gram count).

In some embodiments, the part-of-speech level features score how the words in the URL correspond to frequently used PoS tagging patterns in natural languages. The part-of-speech level features can include frequent part-of-speech (PoS) tagging count, frequent PoS tagging ratio, etc. For example, a bi-gram ["beautiful", "flower" ] from a URL is tagged as [adjective, noun], which matches the frequent PoS tagging pattern adjective+noun in the English language.

As an example, a domain name associated with a DNS request is segmented into various segmentation candidates, and each segmentation candidate is scored using a word database where the word database includes words and various frequencies of the words appearing in text. As an aspect, for each segmentation candidate, a score is determined using the word database. Google Corpus, which includes a trillions words, is an example of a word database.

As an example, "facebook" is segmented to ["f" "ace", "book" ] or ["face", "book" ] or ["facebook" ]. The segments are scored using an NLP technique called "stupid backoff" based on each word's frequency appearing in the word database (e.g., Google Corpus). The highest scored segmentation candidate is the final segmentation result. In this example, the final segmentation result is ["facebook" ] because "facebook" appears more frequently in the word database that any of the other segmentation candidates. As an aspect, the "stupid backoff" technique is an NLP smoothing technique used to calculate the probability of the various segmentation candidates. The "stupid backoff" technique takes into consideration that some high n-grams may be never collected in any corpus, so the "stupid backoff" technique typically uses an n−1 gram for the answer. The "stupid backoff" technique is a fast technique and typically yields good results as scoring is obtained from a real probability distribution via the NLP chain rule.

In some embodiments, the feature extraction module 410 also clusters segmented words using a Brown clustering technique to identify words that appear together less frequently. For example, "New York" is typically clustered together; however, "Carmel-by-the-Sea" is clustered together less frequently.

As an example, the Brown clustering technique is an NLP technique used to cluster related word together such as, for example, city names. Since some city names appear less frequently than some non-city names in the word database, when NLP features are generated for these words, the results can be less than ideal. To adjust for this occurrence, a different word database can be used and the Brown clustering technique can be performed to cluster related words together. As an example, ["New York", "Shanghai", "Carmel-by-the-Sea" ] are part of the same cluster because the words of the cluster are all "places or cities." When a URL is received and segmented to output ["Carmel-by-the-Sea", "city" ], even though the bi-gram can appear less frequently in the word database than other segmentation candidates, the Brown clustering technique is aware that the cluster relates to ["city name", "city" ]. As a result, the Brown clustering technique borrows some points for ["Carmel-by-the-Sea", "city" ] from ["New York", "City" ] so more reasonable feature vectors can be produced and the ML models can better handle these feature vectors.

In some embodiments, the feature extraction module 410 uses pre-generated word clusters to help extract features. In some embodiments, word clusters are generated using the Brown clustering technique where related words are clustered together into the same node based on the context in which the related words occur in natural language. Words in the same node can share weights from the NLP models.

In some embodiments, the trained machine learning model 420 corresponds to a decision tree (DT) or a support vector machine (SVM) model, which can be trained using the samples found in Gozi or Matsnu families. After being trained, the trained machine learning model 420 is input with a feature vector and a vector that corresponds to class probabilities.

In some embodiments, the trained machine learning model 420 is trained using a set of training data. Gozi and/or Matsnu are examples of sets of training data that can be used to train the trained machine learning model 420. Gozi is a set of training data (e.g., 105631 samples) where the support vector machine (SVM) is trained with the Alexa top 50K domains, and the decision tree (DT) is trained with the Alexa top 50K domains. In the example, Matsnu is a set of training data (e.g., 12666 samples) where the support vector machine (SVM) is trained with the Alexa top 50K domains and the decision tree (DT) is trained with the Alexa top 50K domains.

In some embodiments, class thresholds module 430 receives the vector and outputs a final classification.

Some of the benefits of using a machine learning technique in comparison to a deep learning technique such as a deep neural network include machine learning technique decisions are easier to understand than deep learning technique decisions because, for machine learning technique decisions, it can be inferred which features are used to make classification choices. The features from the machine learning technique are human made and meaningful as opposed to features from the deep learning technique where the features are automatically created to fit the task at hand and are harder to interpret. Also if the features are well crafted then there is no need for an architecture search as in case of the deep learning technique.

Figure 5:
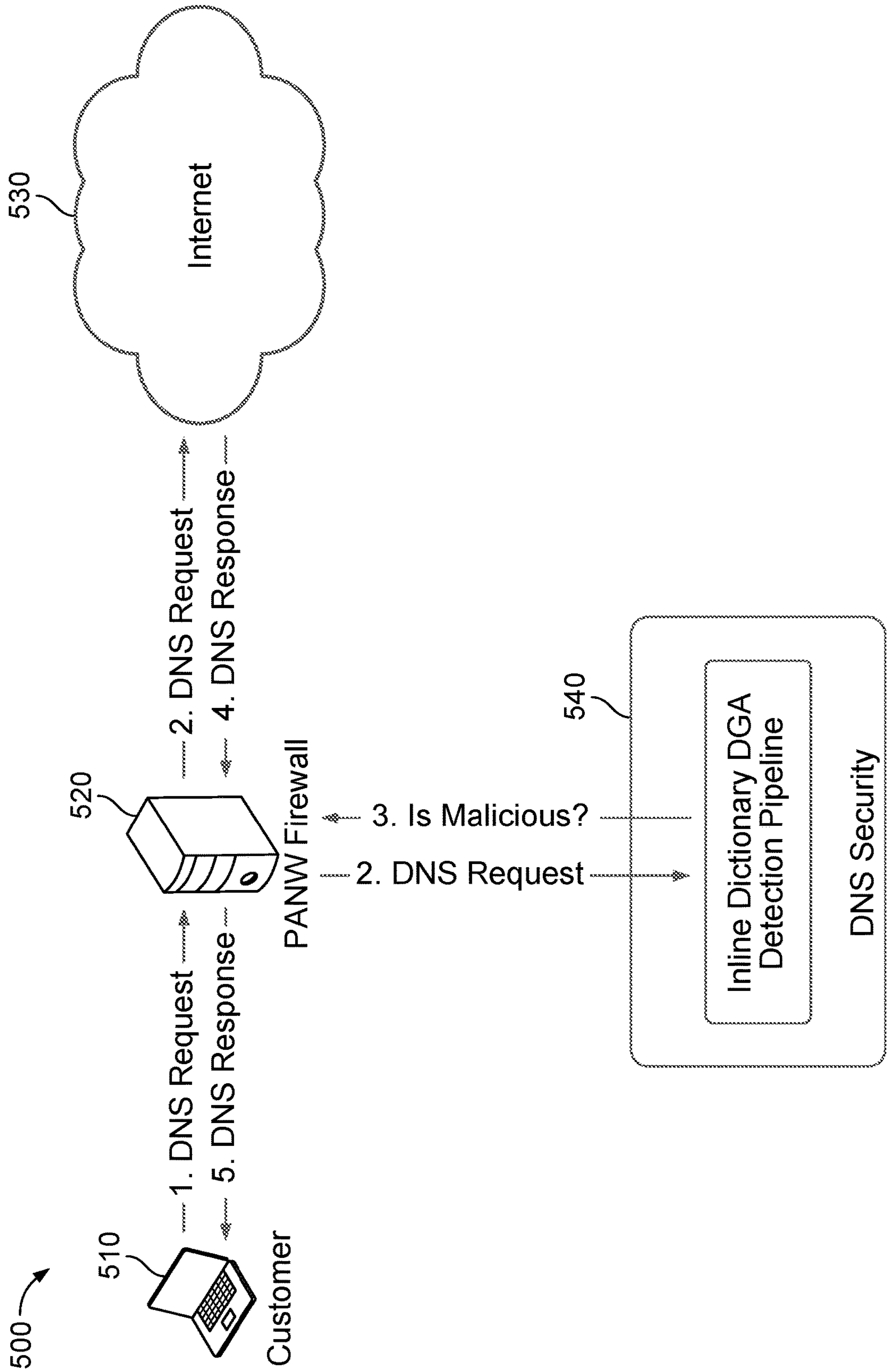
FIG. 5 is another functional block diagram illustrating an architecture for detecting dictionary-based DGA traffic in accordance with some embodiments.

FIG. 5 is another functional block diagram illustrating an architecture for detecting dictionary-based DGA traffic in accordance with some embodiments. In some embodiments, the architecture 500 includes a customer 510, a Firewall 520, the Internet 530, and an Inline Dictionary DGA Detection Pipeline 540.

In operation 1, the customer 510 sends a DNS request to the Firewall 520.

In operation 2, the Firewall 520 forwards the DNS request to the Internet 530 so that the DNS request can be resolved, and also forwards the DNS request to the Inline Dictionary DGA Detection Pipeline 540. In some embodiments, the Inline Dictionary DGA Detection Pipeline 540 is included in a DNS security module.

In operation 3, the Inline Dictionary DGA Detection Pipeline 540 responds to the Firewall 520 with a verdict on whether the DNS request is malicious.

In operation 4, the Firewall 520 receives a DNS response from the Internet 530. In some embodiments, the verdict of operation 3 is returned to the Firewall 520 before or about the same time as when the DNS response (operation 4) arrives at the Firewall 520.

In operation 5, based on the verdict from the Firewall 520 and the DNS response, the Firewall 520 sends a DNS response to the customer 510. For example, in addition, in the event that the Inline Dictionary DGA Detection Pipeline 540 determines that the DNS request is associated with a compromised customer computer, the Firewall 520 can generate an alert, block a response for the domain name, and/or respond with a sinkhole IP address.

Figure 6:
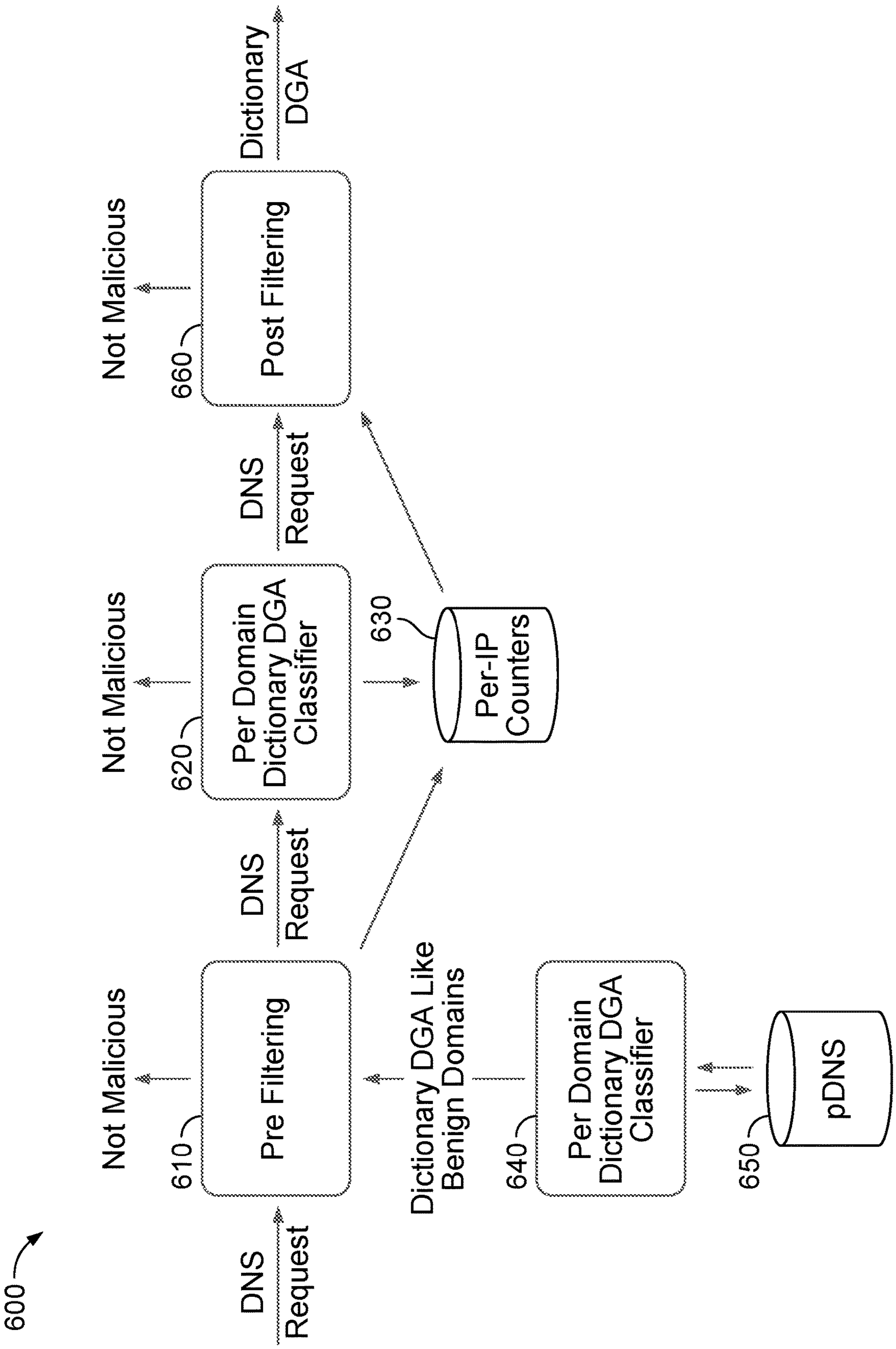
FIG. 6 is another example of a workflow for detecting dictionary-based DGA traffic.

FIG. 6 is another example of a workflow for detecting dictionary-based DGA traffic. In some embodiments, the workflow 600 is implemented by the Inline Dictionary DGA Detection Pipeline 540 of FIG. 5 and includes a pre filtering module 610, a per domain dictionary DGA classifier 620, a per-IP counters module 630, a per domain dictionary DGA classifier 640, a passive DNS (pDNS) module 650, and a post filtering module 660.

In workflow 600, at regular time intervals (e.g., one day), the pre filtering module 610 determines an allowlist of domains that are likely benign or other non-DGA domains that would be classified as dictionary DGA domains by the per domain dictionary DGA classifier 640. The per domain dictionary DGA classifier 640 obtains historical passive DNS queries from the pDNS module 650 and selects domain names with a DNS query pattern inconsistent with DGA domains (e.g., domains that have a long history of being included in DNS queries). Most of the selected domains are benign and some of the selected domains can be illicit or malicious but are unlikely to be DGAs. The domains classified as DGA by the per domain dictionary DGA classifier 640 can be selected for filtering. The per domain dictionary DGA classifier 640 outputs an allowlist used for prefiltering by the pre filtering module 610. For all domains found in the allowlist, the pre filtering module 610 returns a benign verdict. Additionally, the pre filtering module 610 will increase a benign counter for the requesting customer's IP address in the per-ip counters module 630.

Upon receiving a DNS request, the pre filtering module 610 determines whether the domain in the DNS request is in the allowlist of domains, and in the event that the domain is not present in the allow list, the DNS request is sent to the per domain dictionary DGA classifier 620. In the event that the per domain dictionary DGA classifier 620 classifies the domain as benign, the per domain dictionary DGA classifier 620 returns a benign verdict and increases the benign per-ip counter of the per-ip counters module 630. In the event that the per domain dictionary DGA classifier 620 finds the domain to be a dictionary DGA, the per domain dictionary DGA classifier 620 increases a counter for the malware family most likely to have generated the domain name in the per-ip counters module 630 and returns a verdict that the domain is a Dictionary DGA. In some embodiments, in the event that the per domain dictionary DGA classifier 620 finds the domain to be a dictionary DGA, the per domain dictionary DGA classifier 620 increases a counter for the malware family most likely to have generated the domain name of the per-ip counters module 630 and sends the domain to the post filtering module 660. In some embodiments, the post filtering module 660 uses a set of rules based on a combination of the per-ip counters of the per-ip counters module 630 to select which domains have the final malicious dictionary DGA verdict. An example of the set of rules includes a minimum number of dictionary DGA queries seen from a customer IP address before the domains are started to be blocked. Another example of the set of rules includes a proportion of dictionary DGA domains seen in a specific time period. The set of rules are not limited to the examples above.

Figure 7:
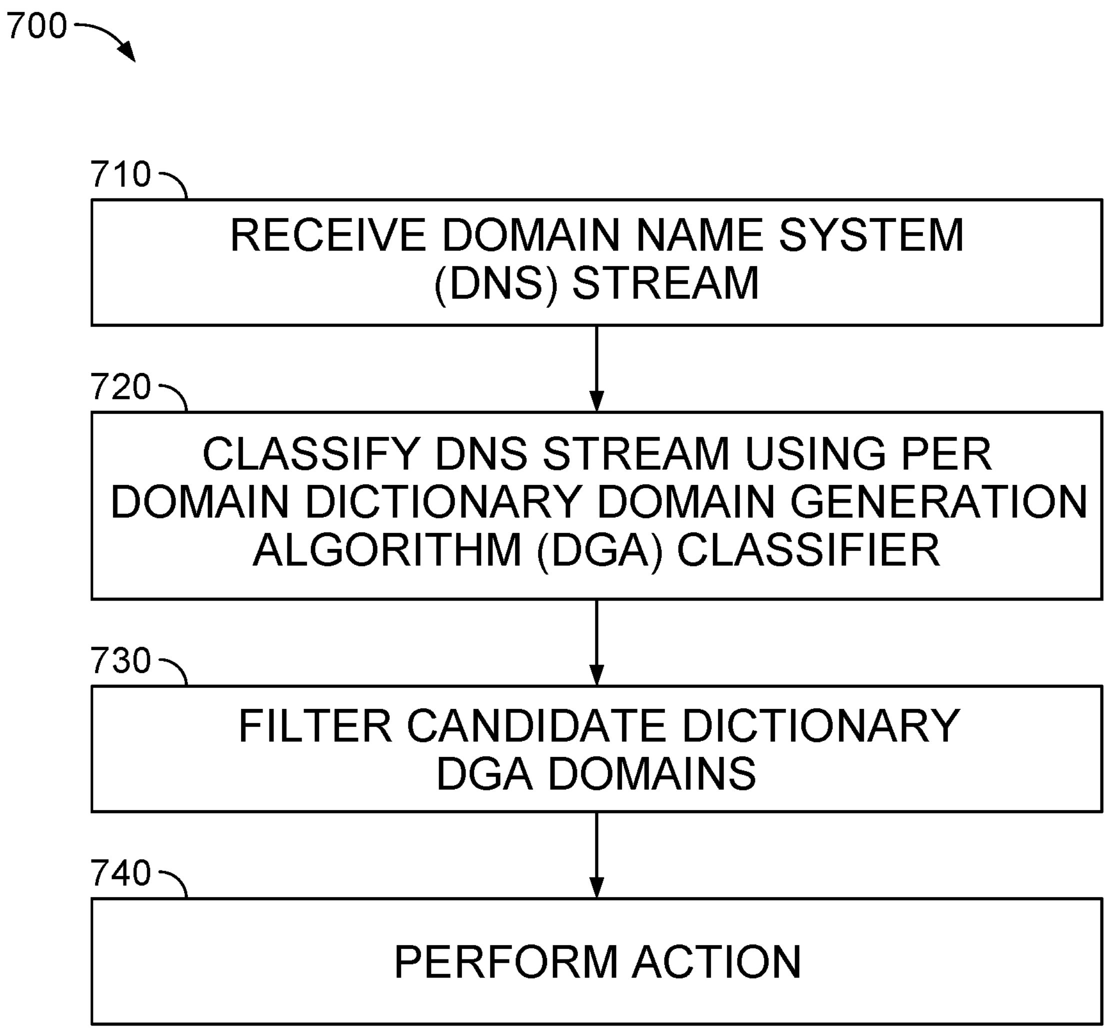
FIG. 7 is a flow diagram illustrating an embodiment of a process for detecting dictionary-based DGA traffic.

FIG. 7 is a flow diagram illustrating an embodiment of a process for detecting dictionary-based DGA traffic. In some embodiments, the process 700 is implemented by the Offline Dictionary DGA Batch Detection Pipeline 160 of FIG. 1A and comprises:

In 710, the pipeline receives a domain name system (DNS) stream.

In 720, the pipeline classifies the DNS stream using a per domain dictionary domain generation algorithm (DGA) classifier to generate candidate dictionary DGA domains with cluster information.

In 730, the pipeline filters the candidate dictionary DGA domains to generate a set of dictionary DGA domains.

In 740, the pipeline performs an action based on a match with a monitored domain name of a monitored DNS request and a dictionary DGA domain of the set of dictionary DGA domains.

Figure 8:
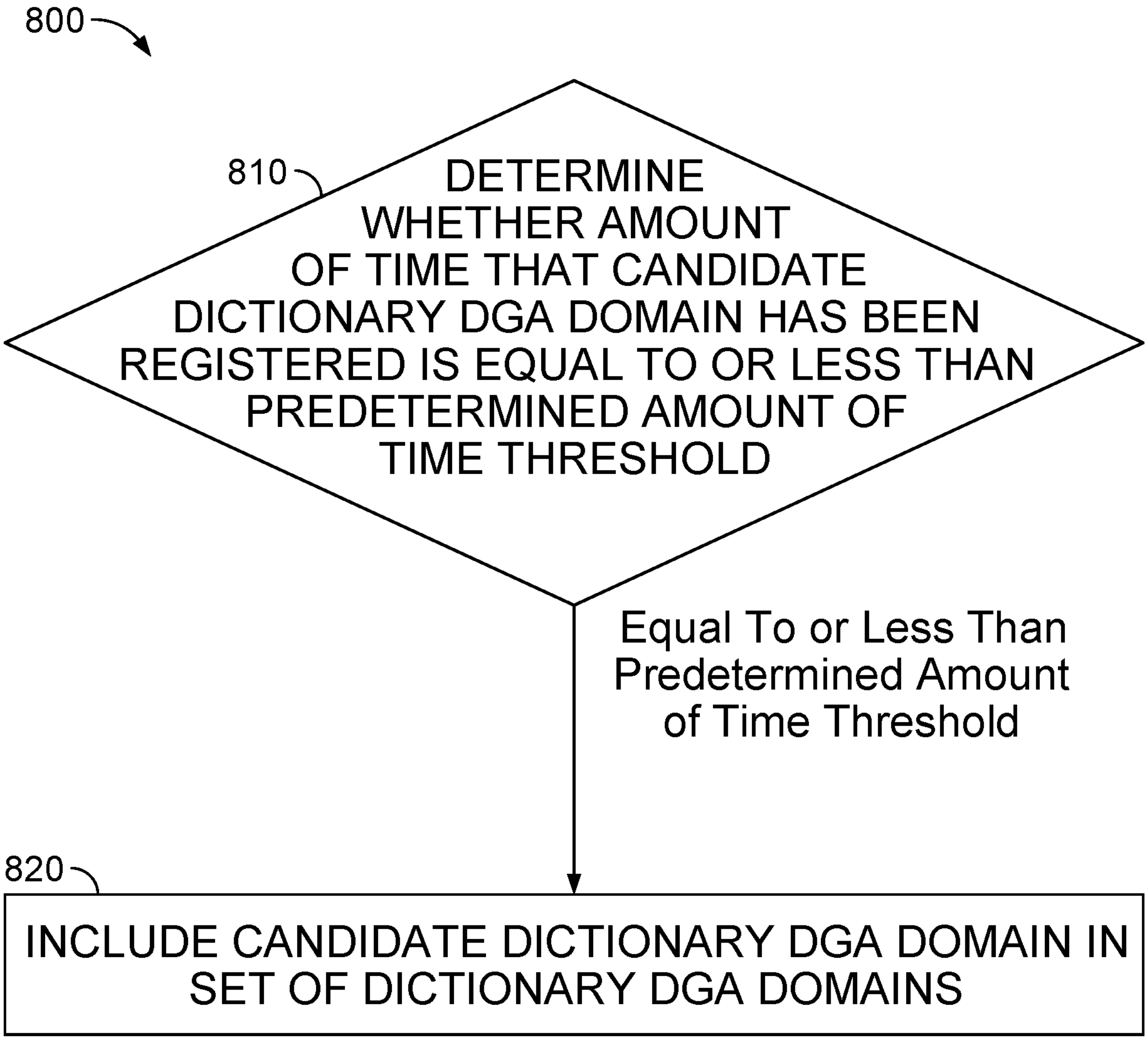
FIG. 8 is a flow diagram illustrating an embodiment of a process for filtering a candidate dictionary DGA domain.

FIG. 8 is a flow diagram illustrating an embodiment of a process for filtering a candidate dictionary DGA domain. In some embodiments, the process 800 is an implementation of operation 730 of FIG. 7 and comprises:

In 810, the pipeline determines whether an amount of time that a candidate dictionary DGA domain has been registered is equal to or less than a predetermined amount of time threshold.

In 820, in response to a determination that the amount of time that the candidate dictionary DGA domain has been registered is equal to or less than a predetermined amount of time threshold, the pipeline includes the candidate dictionary DGA domain in the set of dictionary DGA domains.

Figure 9:
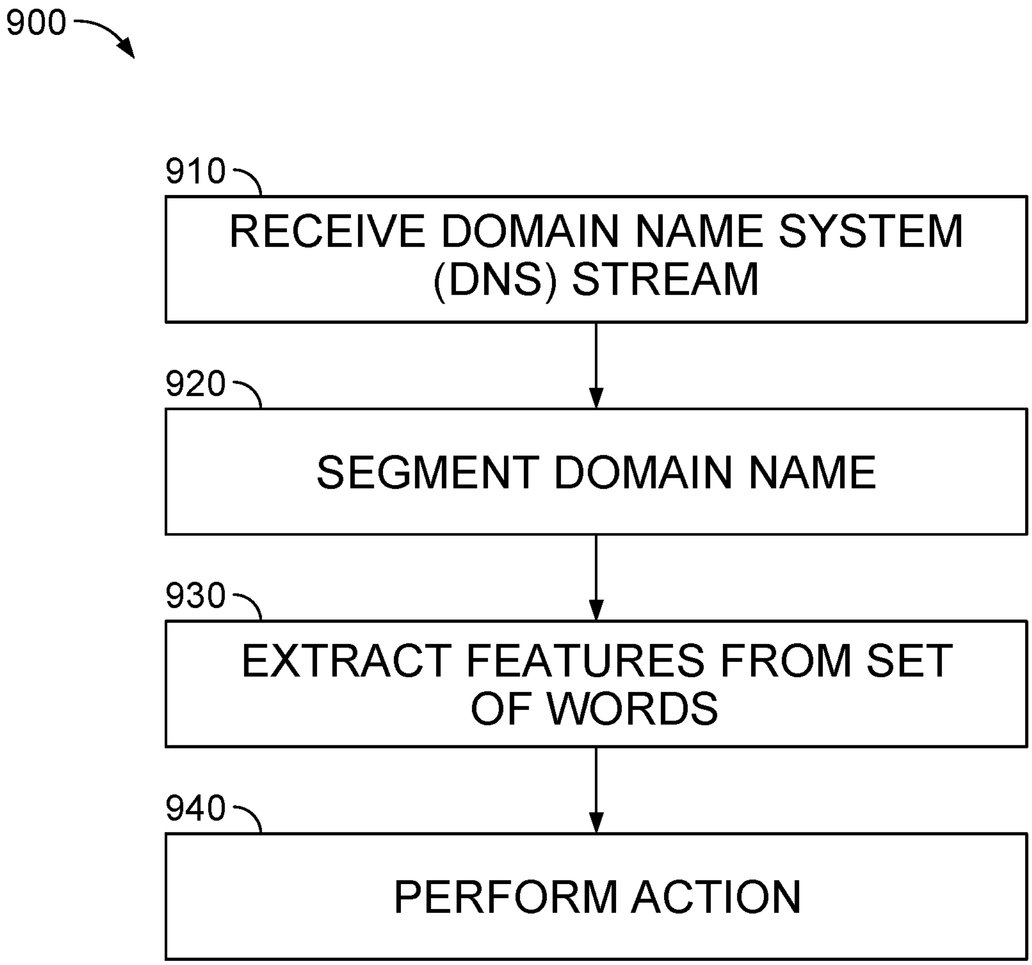
FIG. 9 is a flow diagram illustrating another embodiment of a process for detecting dictionary-based DGA traffic.

FIG. 9 is a flow diagram illustrating another embodiment of a process for detecting dictionary-based DGA traffic. In some embodiments, the process 900 is implemented by the Per Domain Dictionary DGA Classifier 210 of FIG. 2 and comprises:

In 910, the classifier receives a domain name system (DNS) stream, wherein the DNS stream includes a plurality of DNS requests.

In 920, the classifier segments a domain name of one of the plurality of DNS requests into a set of words.

In 930, the classifier extracts features from the set of words to generate a set of dictionary DGA domains.

In 940, the classifier performs an action based on a match with a monitored domain name of a monitored DNS request and a dictionary DGA domain of the set of dictionary DGA domains.

Figure 10:
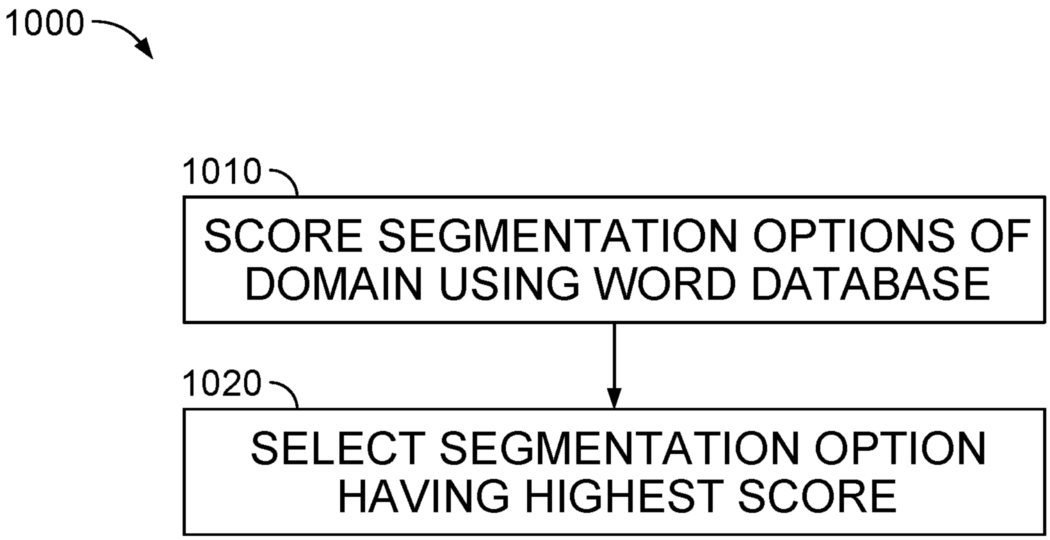
FIG. 10 is a flow diagram illustrating an embodiment of a process for segmenting a domain name.

FIG. 10 is a flow diagram illustrating an embodiment of a process for segmenting a domain name. In some embodiments, the process 1000 is an implementation of operation 920 of FIG. 9 and comprises:

In 1010, the classifier scores segmentation options of the domain name using a word database. In some embodiments, the word database includes a set of words and a set of corresponding frequencies. In some embodiments, a frequency relates to a ratio the word appears in text.

In 1020, the classifier selects a segmentation option having a highest score.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

receive a domain name system (DNS) stream, wherein the DNS stream includes a plurality of DNS requests;

classify the DNS stream using a per domain dictionary domain generation algorithm (DGA) classifier to generate candidate dictionary DGA domains with cluster information of a cluster of the candidate dictionary DGA domains, comprising:

classifying, using the per domain dictionary DGA classifier, domains of the DNS stream into dictionary DGA generated domains or benign domains; and clustering the dictionary DGA generated domains to generate the candidate dictionary DGA domains with the cluster information of the cluster, wherein the cluster is determined based on an IP address of a firewall that originated a DNS request of the plurality of DNS requests;

filter the candidate dictionary DGA domains to generate a set of dictionary DGA domains, comprising:

determining whether an amount of time that a candidate dictionary DGA domain has been registered is greater than a predetermined amount of time threshold or is less than or equal to the predetermined amount of time threshold;

in response to a determination that the amount of time that the candidate dictionary DGA domain has been registered is less than or equal to the predetermined amount of time threshold, including the candidate dictionary DGA domain in the set of dictionary DGA domains; and in response to a determination that the amount of time that the candidate dictionary DGA domain has been registered is greater than the predetermined amount of time threshold, omitting including the candidate dictionary DGA domain in the set of dictionary DGA domains; and perform an action based on a match with a domain name of a monitored DNS request and a dictionary DGA domain of the set of dictionary DGA domains; and a memory coupled to the processor and configured to provide the processor with instructions.

2. The system of claim 1, wherein classify the DNS Stream comprises classifying the DNS stream using a per domain deep learning dictionary DGA classifier to generate the candidate dictionary DGA domains with cluster information.

3. The system of claim 1, wherein classify the DNS Stream comprises classifying the DNS stream using a per domain machine learning dictionary DGA classifier to generate the candidate dictionary DGA domains with cluster information.

4. The system of claim 1, wherein perform the action comprises generating an alert.

5. The system of claim 1, wherein perform the action comprises blocking a response for the domain name.

6. The system of claim 1, wherein perform the action comprises responding with a sinkhole IP address.

7. The system of claim 1, wherein the cluster information includes a source IP address of the monitored DNS request.

8. A method, comprising:

receiving, using a processor, a domain name system (DNS) stream, wherein the DNS stream includes a plurality of DNS requests;

classifying, using the processor, the DNS stream using a per domain dictionary domain generation algorithm (DGA) classifier to generate candidate dictionary DGA domains with cluster information of a cluster of the candidate dictionary DGA domains, comprising:

classifying, using the per domain dictionary DGA classifier, domains of the DNS stream into dictionary DGA generated domains or benign domains; and clustering the dictionary DGA generated domains to generate the candidate dictionary DGA domains with the cluster information of the cluster, wherein the cluster is determined based on an IP address of a firewall that originated a DNS request of the plurality of DNS requests;

filtering, using the processor, the candidate dictionary DGA domains to generate a set of dictionary DGA domains, comprising:

determining whether an amount of time that a candidate dictionary DGA domain has been registered is greater than a predetermined amount of time threshold or is less than or equal to the predetermined amount of time threshold;

in response to a determination that the amount of time that the candidate dictionary DGA domain has been registered is less than or equal to the predetermined amount of time threshold, including the candidate dictionary DGA domain in the set of dictionary DGA domains; and in response to a determination that the amount of time that the candidate dictionary DGA domain has been registered is greater than the predetermined amount of time threshold, omitting to include the candidate dictionary DGA domain in the set of dictionary DGA domains; and performing, using the processor, an action based on a match with a domain name of a monitored DNS request and a dictionary DGA domain of the set of dictionary DGA domains.

9. A non-transitory computer program product embodied in a non-transitory computer readable medium and comprising computer instructions for:

receiving a domain name system (DNS) stream, wherein the DNS stream includes a plurality of DNS requests;

classifying the DNS stream using a per domain dictionary domain generation algorithm (DGA) classifier to generate candidate dictionary DGA domains with cluster information of a cluster of the candidate dictionary DGA domains, comprising:

classifying, using the per domain dictionary DGA classifier, domains of the DNS stream into dictionary DGA generated domains or benign domains; and clustering the dictionary DGA generated domains to generate the candidate dictionary DGA domains with the cluster information of the cluster, wherein the cluster is determined based on an IP address of a firewall that originated a DNS request of the plurality of DNS requests;

filtering the candidate dictionary DGA domains to generate a set of dictionary DGA domains, comprising:

determining whether an amount of time that a candidate dictionary DGA domain has been registered is greater than a predetermined amount of time threshold or is less than or equal to the predetermined amount of time threshold;

in response to a determination that the amount of time that the candidate dictionary DGA domain has been registered is less than or equal to the predetermined amount of time threshold, including the candidate dictionary DGA domain in the set of dictionary DGA domains; and in response to a determination that the amount of time that the candidate dictionary DGA domain has been registered is greater than the predetermined amount of time threshold, omitting to include the candidate dictionary DGA domain in the set of dictionary DGA domains; and performing an action based on a match with a domain name of a monitored DNS request and a dictionary DGA domain of the set of dictionary DGA domains.

* * * * *